United States Patent
Kitoh et al.

(10) Patent No.: US 6,352,793 B2
(45) Date of Patent: *Mar. 5, 2002

(54) LITHIUM SECONDARY BATTERY

(75) Inventors: Kenshin Kitoh; Hiroshi Nemoto, both of Nagoya (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,563

(22) Filed: Oct. 9, 1998

(30) Foreign Application Priority Data

Oct. 14, 1997 (JP) ............................. 9-280810

(51) Int. Cl.$^7$ .................. H01M 2/02; H01M 10/50; H01M 10/40

(52) U.S. Cl. .................. 429/120; 429/163; 429/164; 429/176

(58) Field of Search .................. 429/163–168, 429/224, 120, 176

(56) References Cited

U.S. PATENT DOCUMENTS

| | | | |
|---|---|---|---|
| 5,443,925 A | | 8/1995 | Machida et al. ............. 429/94 |
| 5,660,951 A | * | 8/1997 | Yoshida |

FOREIGN PATENT DOCUMENTS

| | | | |
|---|---|---|---|
| EP | 0 843 369 | | 5/1998 |
| JP | 5-67457 | * | 3/1993 |
| JP | 8-138633 | | 5/1996 |
| JP | 8-250084 | | 9/1996 |
| JP | 9-73885 | * | 3/1997 |

OTHER PUBLICATIONS

Shackelford, James F. Introduction to Materials Science for Engineers, 3rd ed. Macmillan Publishing Co., p. 315, 1992.*
"The Technical Report of IEICE CPM 97–63 (1997–08)" (Abstract–English).
Patent Abstracts of Japan, vol. 098, No. 004, Mar. 31, 1998 & JP 09 316580 A (Mitsubishi Alum Co Ltd.), Mar. 31, 1998.
Patent Abstracts of Japan, vol. 097, No. 010, Oct. 31, 1997 & JP 09 147814 A (Shin Kobe Electric Mach Co Ltd.), Jun. 6, 1997.
Patent Abstracts of Japan, vol. 097, No. 007, Jul. 31, 1997 & JP 09 073885 A (Sony Corp), Mar. 18, 1997.
Database WPI Section Ch, Week 7931, Derwent Publications Ltd., London, GB; Class A85, AN 79–56832B XP002090597 & JP 54 076929 A (Sanyo Electric Co), Jun. 20, 1979.

(List continued on next page.)

Primary Examiner—Stephen Kalafut
Assistant Examiner—Jonathan Crepeau
(74) Attorney, Agent, or Firm—Burr & Brown

(57) ABSTRACT

A lithium secondary battery includes: a battery case, and an internal electrode body (1) contained in the battery case and including a positive electrode (2), a negative electrode (3), and a separator (4) made of porous polymer. The battery case is composed of pure aluminum or aluminum alloy in which one or more components selected from manganese, magnesium, silicon and copper is added to the aluminum. The lithium secondary battery has high energy density, is superior in safety, and is used for, particularly, an electric vehicle. Preferably the battery has a capacity of 50 Wh or more, and the following relationships are established: $0.004 \leq t/d \leq 0.04$, where the battery case is cylindrical, its outer diameter is d (mm), and its wall thickness is t (mm); and $C/(w \cdot c) \leq 0.03$, where current capacity is C (Ah), battery weight is w (kg), and specific heat of the battery is c(W/kg° C.).

5 Claims, 2 Drawing Sheets

OTHER PUBLICATIONS

Database WPI Section EI, Week 9844, Derwent Publications Ltd., London, GB; Class X16, AN 98–516990 XP002090596 & JP 10 228888 A (Japan StorageBattery Co Ltd.), Aug. 25, 1998.

Patent Abstracts of Japan, vol. 098, No. 008, Jun. 30, 1998 & JP 10–064515 A (Shin Kobe Electric Mach Co Ltd.), Mar. 6, 1998.

Patent Abstracts of Japan, vol. 098, No. 005, Apr. 30, 1998 & JP 10 021889 A (Toyota Central Res & Dev Lab Inc), Jan. 23, 1998.

Patent Abstracts of Japan, vol. 098, No. 004, Mar. 31, 1998 & JP 09 320549A (Oonishi Norihiro), Dec. 12, 1997.

Patent Abstracts of Japan, vol. 098, No. 012, Oct. 31, 1998 & JP 10 199493 A (Japan Storage Battery Co Ltd), Jul. 31, 1998.

Patent Abstracts of Japan, vol. 098, No. 006, Apr. 30, 1998 & JP 10 050272 A (Sanyo Electric Co Ltd.), Feb. 20, 1998.

Patent Abstracts of Japan, vol. 098, No. 003, Jan. 27, 1998 & JP 09 306443 A (Haibaru: KK), Nov. 28, 1997.

* cited by examiner

LITHIUM SECONDARY BATTERY

BACKGROUND OF THE INVENTION AND RELATED ART STATEMENT

The present invention relates to a lithium secondary battery which is superior in safety, and has high weight energy density (energy stored per unit weight, hereinafter called "energy density"), and which is suitably used for, particularly, an electric vehicle.

In recent years, the lithium secondary battery is being rapidly and widely used to realize a small power source for portable electronic equipment. In addition, effort of development is being also made to realize practical use of the lithium secondary battery as a motor driving battery for an electric vehicle which replaces a gasoline-powered vehicle, and as a battery for storing electric power in the night.

The structure of lithium secondary battery is roughly divided into a wound type shown in FIG. 2 and a laminated type shown in FIG. 3. An internal electrode body 1 of the wound type is constituted by winding a positive electrode 2 and a negative electrode 3 through a separator 4, in which the positive electrode 2 with a large area or the like can be contained in a tubular container. In the case of this wound type, since it is sufficient that there is at least one lead 5 from each electrode 2, 3, and, even if it is desired to lower current collection resistance of each electrode 2, 3, it is sufficient to increase the number of leads, there is an advantage that the internal structure of the battery does not become complicated to make for easy assembly of the battery.

On the other hand, an internal electrode body 7 of the laminated type is constructed by alternately laminating positive electrodes 8 and negative electrodes 9 in multiple layers through separators 10, in which area per one positive electrode 8 or the like is not large, but the electrode area of the entire battery can be increased by laminating them in multiple layers. The internal electrode body 7 being produced can be designed into any desired shape including a rectangular parallelepiped, cylindrical or tubular shape depending on the shape of each electrode 8, 9 and the number of laminations. However, since a lead 6 is necessary for each electrode 8, 9, there is a disadvantage that the internal structure of the battery becomes complicated, and it is inferior to the wound type in view of assembly workability of the battery.

In both the wound and laminated type structures, the internal electrode body is housed in a metal battery case so that each electrode and lead do not contact each other. Conventionally, stainless steel is most widely used for this battery case, and sometimes nickel, titanium or the like may be used.

However, since stainless steel and nickel have higher specific gravities, there is a disadvantage that, when it is used for the battery case, the battery itself becomes heavy, so that the energy density is low. On the other hand, while titanium has an advantage to have lower specific gravity than stainless steel or nickel, and to be excellent in corrosion resistance, it is expensive, and its use is limited to a specific application such as space development, so that it is difficult to be used as a general purpose battery component. In addition, in the lithium secondary battery, the battery case itself is often used as a current path for the positive or negative electrodes, and such material has high electric resistance, leading to a cause of power loss. In addition, such metal is not always said to have good workability as the battery case.

Under such circumstances, a lithium secondary battery for an electric vehicle (EV) or hybrid electric vehicle (HEV) is required to have a cell capacity of at least 50 Wh, to be light enough so as not to increase the weight of the vehicle itself, and to have high safety. To meet such requirements, stainless steel having a high melting point and high strength has been conventionally used by particularly taking safety into consideration. However, as described earlier, it is difficult to solve the problem for reducing weight of the battery. In addition, EV and HEV require a high current in acceleration, and, when the battery case is used as the current path, magnitude of electric resistance of the battery case cannot be ignored, and there remains a problem on workability of the battery case when the size is increased. Also, when nickel or titanium is used, such problems are also difficult to be solved because of physical characteristics of these materials.

Then, to solve such problems, the inventors have studied the possibility to use aluminum as the battery case which has light weight, is excellent in electron conductivity, and of good workability. There is no precedent to use aluminum as a battery case for a large battery of 50 Wh or more. This may be because the melting point of aluminum is as relatively low as 660° C., a temperature significantly lower than those of the above materials, and, when the battery case is softened or melted due to erroneous use or the like, it is feared that the electrolyte will evaporate or burn, or explode in the worst case.

According to Battery Association of Japan, as the "Guideline for Safety Evaluation on Secondary Lithium Cells" (commonly called "SBA Guideline"), it regulates that even if the entire energy fully charged is instantaneously discharged by an external short-circuit or an internal short-circuiting caused by a nail piercing test or the like, and then the lithium secondary battery generates heat, the battery does not burst or burn.

While such safety is strictly required, the inventors found that, even when an aluminum battery case is used, the problems on safety could be solved by accurately measuring temperature rise on the surface of the battery to calculate specific heat of the battery, and identifying the relationship between battery capacity and weight, and that reduction of energy density could be prevented by optimizing the battery case shape, and thus reached the present invention.

SUMMARY OF THE INVENTION

That is, according to the present invention, there is provided a lithium secondary battery comprising:

a battery case, and an internal electrode body contained in the battery case and including a positive electrode, a negative electrode, and a separator made of porous polymer, the positive electrode and the negative electrode being wound or laminated through the separator so that the positive electrode and the negative electrode are not brought into direct contact with each other;

wherein the battery case is composed of pure aluminum or aluminum alloy in which one or more components selected from manganese, magnesium, silicon and copper is added to the aluminum.

In addition, in the lithium secondary battery of the present invention, it is preferable in view of assuring safety of the battery that a relationship of $C/(w \cdot c) \leq 0.03$ is established where current capacity is C (Ah), battery weight is w (kg), and specific heat of the battery is c(W/kg·° C.). It is also preferable in view of attaining both high energy density and safety that a relationship of $0.004 \leq t/d \leq 0.04$ is established where the battery case is cylindrical, its outer diameter is d (mm), and its wall thickness is t (mm). Moreover, such conditions are preferably applied to a lithium secondary battery with a battery capacity of 50 Wh or more. The lithium secondary battery satisfying such conditions is suitably used as a battery for an electric vehicle or a hybrid electric vehicle. With this regard, the lithium secondary battery of the present invention preferably uses lithium-manganese oxide ($LiMn_2O_4$) as the positive active material.

As described above, the lithium secondary battery of the present invention reduces weight of the battery case while assuring high safety, so that it has a high energy density.

DETAILED DESCRIPTION OF THE PREFERRED EMBODIMENTS

Now, embodiments of the present invention will be described, but the present invention is not limited to these embodiments.

Figure 2:
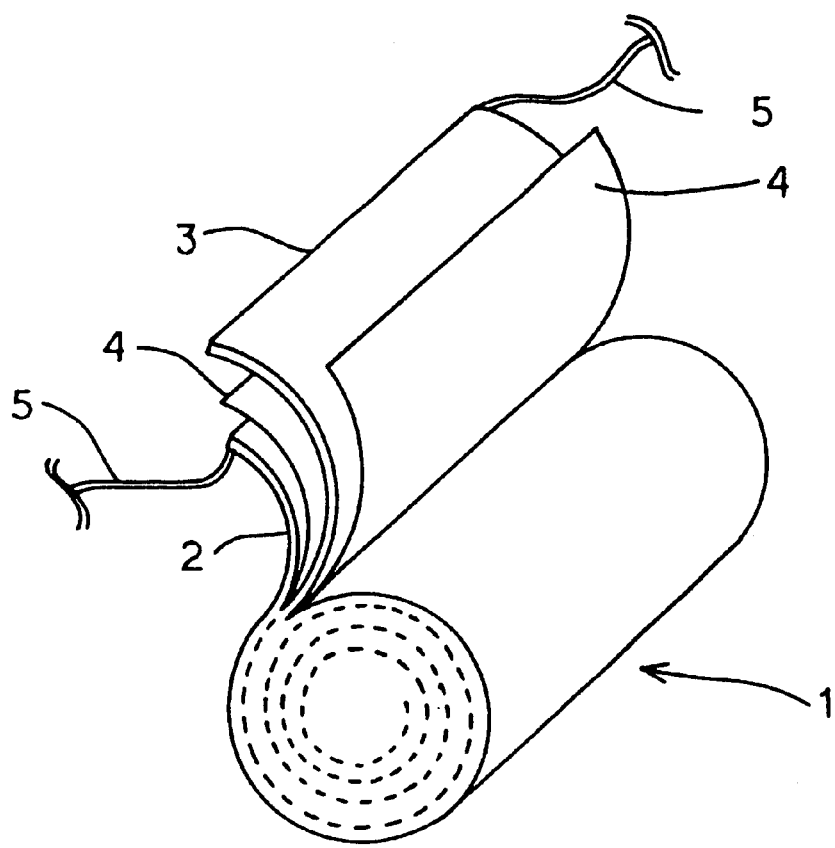
FIG. 2 is a perspective view showing a structure of a wound-type internal electrode body.
Figure 3:
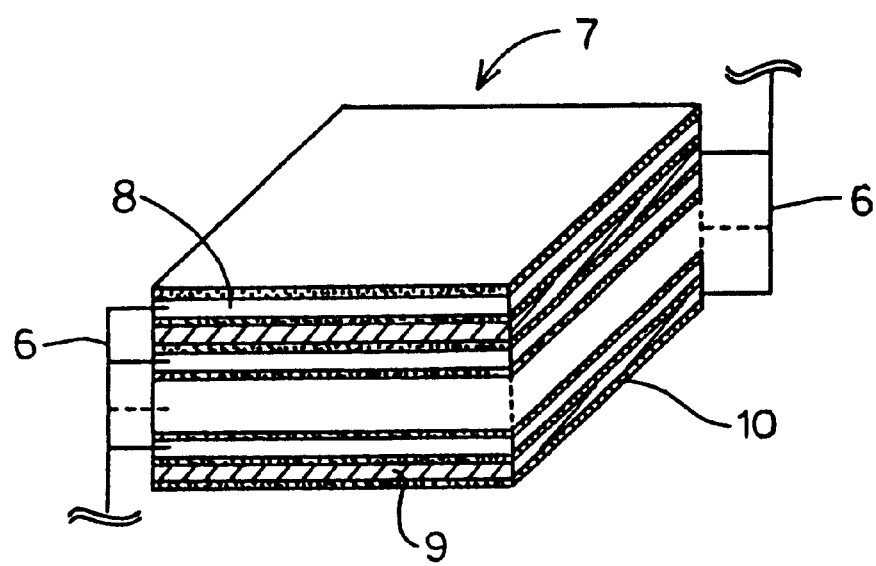
FIG. 3 is a perspective view showing a structure of a laminated-type internal electrode body.

In the lithium secondary battery of the present invention, an internal electrode body is composed by winding or laminating positive and negative electrodes through separator films of porous polymer such that the positive electrodes do not directly contact the negative electrodes. Specifically, it includes structures shown in FIGS. 2 and 3, that is, internal electrode bodies 1 and 7.

The positive electrode used is an aluminum foil applied with a mixture of positive active material and carbon powder to improve conductivity. As the positive active material, there can be used, for example, lithium-cobalt oxide ($LiCoO_2$), lithium-nickel oxide ($LiNiO_2$), or lithium-manganese oxide ($LiMn_2O_4$). The present invention preferably uses $LiMn_2O_4$. In addition, as the carbon powder, there can be used, for example, acetylene black, graphite powder or the like. It is preferable to use a high purity material for the aluminum foil constituting the positive electrode to prevent the battery performance from lowering due to corrosion by an electrochemical reaction of the battery.

On the other hand, for the negative electrode it is preferable to use a copper foil coated with an amorphous carbon material such as soft carbon or hard carbon, or carbon powder such as natural graphite as the negative active material. Here, similarly to the aluminum foil used for the positive electrode, it is preferable to use a high purity material for the copper foil used as the negative electrode to withstand the corrosion due to an electrochemical reaction.

When the above-mentioned carbon material is used for the negative electrode, it is known that a part of the lithium ions adsorbed to the carbon material at the initial charging reaction of the battery becomes the so-called dead lithium which is kept adsorbed to the carbon material and does not contribute to the subsequent charging and discharging reactions, so that the capacity of the battery is lowered. Thus, it is preferable to select a material in which the amount of the dead lithium is small as the carbon material for the negative active material.

As a material of the separator film, it is preferable to use a three-layer structural material in which a polyethylene film having lithium ion permeability and including micropores is sandwiched between porous polypropylene films having lithium ion permeability. This serves also as a safety mechanism in which when the temperature of the internal electrode body is raised, the polyethylene film is softened at about 130° C. so that the micropores are collapsed to suppress the movement of lithium ions, that is, the battery reaction. When the polyethylene film is sandwiched between the polypropylene films having a softening temperature higher than the polyethylene film, it is possible to prevent the contact between the positive and negative electrodes even after softening of polyethylene.

The internal electrode body produced using such material is housed in the battery case. The present invention uses a battery case composed of pure aluminum or aluminum alloy in which one or more components selected from manganese, magnesium, silicon and copper is added to the aluminum. Here, pure aluminum does not refer to aluminum with 100% purity, but may contain impurities which are unavoidably mixed during an ordinary refining or manufacturing process, and, more specifically, the purity is preferably 99% or more. In addition, as for the aluminum alloy, it does not mean that impurities unavoidably mixed during an ordinary manufacturing process are not similarly excluded from aluminum which is the main component. Specific examples of aluminum alloy include alloy No. 3203 (aluminum-manganese alloy) prescribed in JIS.

Here, the aluminum battery case means that a main portion of the battery case, that is, a container into which the internal wound body is inserted for storage is made of aluminum, and a sealing member for sealing an opening of the battery case is not necessarily made of aluminum. For example, when the internal electrode body is a cylindrical wound body shown in FIG. 2, it is sufficient that at least a cylindrical container opened at both ends, or a bottomed cylindrical container opened at only one end is made of aluminum. When the internal electrode body is a rectangular parallelepiped laminated body shown in FIG. 3, as long as at least a tubular container with a rectangular section or a rectangular parallelepiped box-like container opened only at one side is made of aluminum, it is preferably used for the present invention.

The reason why the opening or the like through which the internal electrode body is inserted is excluded from the battery case lies in that the sealing member for sealing the opening of the battery case is sometimes preferably constituted by an insulating material such as heat resistance resin or ceramics for the purpose of installing an external terminal for taking out electric energy from the internal electrode body or isolating an electric path of the positive and negative electrodes within the battery. Of course, the above example does not exclude a battery case which can be entirely composed of aluminum for the outer shell of the battery by disposing insulating materials at appropriate locations to assure electric paths for the positive and negative electrodes, and using an aluminum part for the sealing member.

Then, the battery is produced by the internal electrode body, the battery case and other necessary members such as electrode terminals. In this case, as for the structure for the battery being produced, it may be possible to adopt a structure which is a structure of a known small battery enlarged as it is. In addition, the inventors have proposed in Japanese Patent Application No. 9-202963 a structure of a lithium secondary battery in which various pressure releasing mechanisms are disposed at appropriate locations, and such structure may be preferably employed. Moreover, the battery thus produced preferably has at least one pressure release valve which releases the battery internal pressure to the ambient air pressure when the battery internal pressure rises and reaches a predetermined pressure due to erroneous use of the battery or the like, thereby preventing explosion due to a rise of internal pressure of the battery.

According to the present invention, where current capacity of the battery produced by using the aluminum battery case is C (Ah), the battery weight is w (kg), and the specific heat of the battery is c(W/kg·° C.), the battery is preferably designed such that a relationship of $C/(w·c) \leq 0.03$ is established. Here, the specific heat c of battery is defined to be power (W) necessary for raising temperature of a battery of 1 kg by 1° C. Therefore, even if the same battery case is used in producing the battery, the battery has a different specific heat if components other than the battery case differ, while, even if the volume of the battery is the same, the battery has different specific heat depending on the material and wall thickness of the battery case, the size of internal electrode body or the like.

However, when the construction conditions are established to assure safety even if all energy which the battery can store is used to raise temperature of the battery, that is, the battery is arranged such that the relationship of $C/(w·c) \leq 0.03$ is established, it is possible to obtain a battery in which temperature rise due to generated heat does not cause softening or melting of the battery case, and which can clear the safety criteria of the SBA Guideline even if the energy charged in the battery is instantaneously discharged as external short-circuiting is caused or as internal short-circuiting is caused by the nail piercing test.

In addition, it is preferable in the present invention that the relationship of $0.004 \leq t/d \leq 0.04$ is established where the battery case is cylindrical, the outer diameter of the battery case is d (mm), and the wall thickness is t (mm). For example, in the case where the battery case has a thin wall thickness t when the outer diameter d of the battery case is constant, that is, the value of t/d is small, the energy density of the battery increases since the weight of battery case is reduced as the battery capacity is increased, and there arises a problem in safety since the strength of battery case is lowered. On the other hand, in the case where the battery case has a thick wall thickness t, that is the value of t/d is large, it is desirable from the viewpoint of safety since the strength of battery case is heightened, but there arises a problem that the energy density is reduced as a whole since the weight of the battery case is increased, and the battery capacity is also reduced.

Thus, when the battery is arranged to have a ratio of the outer dimension of battery case to the wall thickness in a specific range, it becomes possible to assure safety while maintaining the energy density of the battery at a proper high value.

In the case where the battery case is a rectangular parallelepiped, the above relationship can be analogously applied by assuming that the outer diameter of a circle having the same area as the section perpendicular in the longitudinal direction is the outer diameter d of the battery case.

As described earlier, the present invention is attained as the result of a study mainly on the possibility of use of an aluminum battery case for a battery with large capacity which has not been produced, and the technical features of the present invention are suitably employed in a lithium secondary battery having battery capacity of 50 Wh or more. However, it is needless to say that there is no problem to employ the structure of battery with large capacity for which the safety criteria are strict as above for a battery with smaller capacity.

Thus, the battery with large capacity per unit cell produced by using a battery case composed of aluminum has excellent advantages that the battery has lighter weight, and that it has higher energy density. When compared with a case where a plurality of batteries with small capacity are connected to obtain a battery with equivalent capacity, contact resistance due to battery connection can be reduced as the number of series/parallel connections is reduced in the battery, and mounting space for the battery can be saved. Therefore, the lithium secondary battery of the present invention is suitable in applications such as the power supply for an electric or hybrid electric vehicle or as power supply for various mobile equipment.

Examples

Now, examples of lithium secondary battery according to the present invention are described, but it is needless to say that the present invention is not limited to these examples.

First, description is given of members commonly used for the examples and the battery structure. The positive electrode was formed of an aluminum foil coated with a mixture in which carbon powder (acetylene black) for improving the conductivity was added to lithium-manganese oxide ($LiMn_2O_4$) as a positive active material. The negative electrode was formed of a copper foil coated with graphite powder. As a separator for separating the positive electrode from the negative electrode, a microporous separator made of polypropylene was used. The electrolyte was prepared by dissolving an $LiPF_6$ electrolyte in a mixed solution of ethylene carbonate (EC) and diethyl carbonate (DEC). The battery was a cylindrical type which was formed by inserting a cylindrical internal electrode body, in which the positive and negative electrodes were wound through the separator, into a cylindrical battery case, both ends of the case being sealed with a structure shown in FIG. 1.

Figure 1:
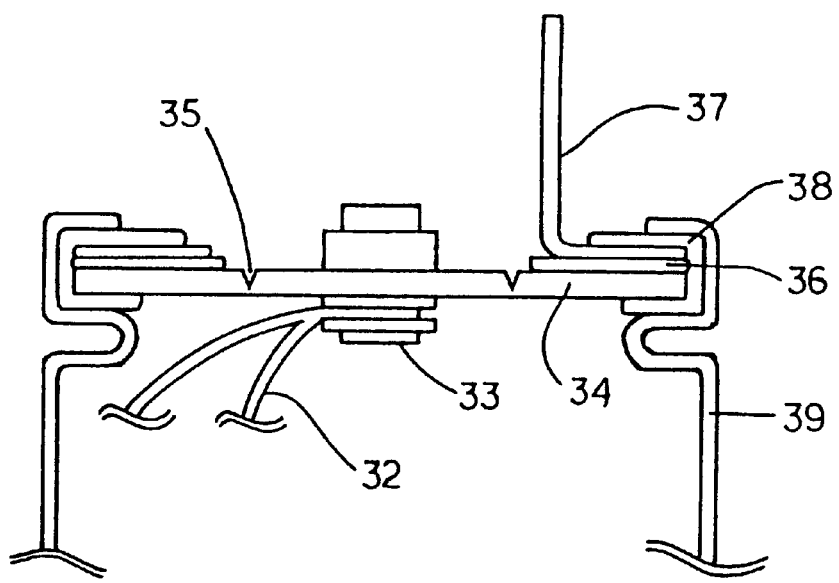
FIG. 1 is a sectional view showing a structure at the end of a lithium secondary battery produced according to an embodiment.

Here, in FIG. 1, a lead 32 for electricity collection connected to either one of the positive or negative electrode (not shown) was connected to a metal rivet 33 as an internal terminal mounted on a disk 34 for sealing a battery case 39. Then, the disk 34 was provided with a pressure release valve 35 which was burst when the internal pressure of the battery reached a predetermined pressure, and crimped onto the battery case 39 through ethylene propylene rubber 38 so that an external terminal 37 was electrically connected to the disk 34 through a metal ring 36, and that the disk 34, the metal ring 36 and the external terminal 37 were electrically insulated from the battery case. Thus, there was formed a battery of cylindrical type with both terminals in which the external terminal for either one of the positive or negative electrode was disposed on one end of the battery case 39.

Test for Selecting Battery Case Material

Then, batteries in the battery size of outer diameter 50 mm and length 245 mm and having the above-mentioned structure were formed by using battery cases with an outer diameter 50 mm and wall thickness of 1 mm composed of various materials listed in Table 1, and the energy density of each battery was measured. Here, aluminum alloy was aluminum added with manganese, while SUS-304 was used as stainless steel. In addition, the disk 34 for sealing the end of battery case 39 was made of the same material as the battery case 39, and the area of the electrode was made equal so that capacity of all batteries became 100 Wh.

TABLE 1

|  | Battery case material | Energy density (Wh/kg) |
| --- | --- | --- |
| Example 1 | Aluminum | 116 |
| Example 2 | Aluminum alloy | 115 |
| Comparative example 1 | Stainless steel | 94 |
| Comparative example 2 | Nickel | 89 |
| Comparative example 3 | Titanium | 107 |

The energy densities of the produced batteries are also listed in Table 1. It is significant that a battery case material with higher density tends to provide lower resultant energy density. That is, in the case of comparative example 2 where nickel with the highest density was used as the battery case material, the energy density was the lowest of 89 Wh/kg, and the energy density became higher as the density of battery case material decreased in the order of stainless steel (comparative example 1), titanium (comparative example 3), and aluminum (examples 1 and 2). Examples 1 and 2 using aluminum according to the present invention provided energy density of about 115 Wh/kg. Since the energy density was 94 Wh/kg for comparative example 1 using stainless steel which had been generally used as the battery case material, the characteristic of energy density was improved by about 20% by using aluminum or aluminum alloy for the battery case. Examples 1 and 2 were believed to have similar energy density because there was no significant difference in density between aluminum and aluminum alloy. In addition, in this test, since the battery case was not used as a current path, and distance was very short between the lead connected to the disk for sealing the battery case and the external terminal, impact on the energy density due to difference of conductivity of the battery case materials (disk for sealing the battery case) used can be ignored.

Test for Identifying Battery Case Shape

Effectiveness in using aluminum for the battery case was demonstrated from the result of the test for selecting battery case material described above. Then, batteries were produced with various wall thickness t by using aluminum for the battery case, fixing the outer diameter d of the battery case to 50 mm, and length of the battery to 245 mm, and varying the wall thickness t (mm) in view of improvement of energy density and securing of safety, and measured for energy density and bulging (deformation) of the battery case after completing 100 charging/discharging cycles with discharging rate of 0.2C and depth of discharge (D.O.D.) 100%. Table 2 lists values of t/d and results of the produced battery cases.

TABLE 2

|  | t/d | Energy density (Wh/kg) | Bulging after 100 cycles (mm) |
| --- | --- | --- | --- |
| Comparative example 4 | 0.002 | 141 | >0.5 |
| Example 3 | 0.004 | 137 | 0.2 |
| Example 4 | 0.01 | 130 | 0.1 |
| Example 5 | 0.02 | 117 | <0.1 |
| Example 6 | 0.04 | 101 | 0.0 |
| Comparative example 5 | 0.06 | 82 | 0.0 |
| Comparative example 6 | 0.1 | 57 | 0.0 |

Although the outer diameter of battery case is fixed, since the inner diameter of battery case is reduced as the wall thickness of battery case is thickened, the size of internal electrode body which can be housed in the battery case is reduced, that is, the area of electrodes is made small, so that the absolute value of battery capacity is decreased. In addition, as the wall thickness of battery case is thickened, ratio of the battery case to the weight of entire battery is increased. This increases the value of t/d as listed in Table 2. That is, as the wall thickness of battery case is thickened, the energy density significantly tends to decrease.

Here, since comparative example 4 has as small t/d as 0.002, it had a light battery case, and very high energy density of about 140 Wh/kg. However, it has large bulging of the outer diameter of battery case after the charging/discharging test of the 100 cycles, and is found to have a problem in safety. On the other hand, comparative example 5 had as large t/d as 0.06, so that no deformation of battery case was observed after the charging/discharging test of 100 cycles, but it could not provide a desired energy density of 100 Wh/kg or more due to an increase of weight of the battery case and a decrease of volume of the internal electrode body which could be housed in the battery case.

It is revealed from Table 2 that $0.004 \leq t/d \leq 0.04$ is preferable as the condition for assuring safety as well as output density of 100 Wh/kg, as shown in examples 3 through 6. In addition, the most preferable characteristic can be attained with bulging suppressed to as low as 0.1 mm or less while maintaining high energy density by making $0.01 \leq t/d \leq 0.02$.

Test for Measuring Specific Heat of Battery

Then, specific heat was measured on example 5 which had the value of t/d of 0.02 or the wall thickness of 1 mm, which was believed to be preferable from the viewpoint of the energy density and safety in the above-mentioned test for identifying shape of battery case. The specific heat was measured by attaching a T-type thermocouple at the longitudinal center of side of battery, discharging the battery at a current of 27 A to 2.5 V in a 25° C. constant temperature bath after constant current charging at 10 A and constant voltage charging at 4.1 V (6 hours in total), and measuring temperature rise of the battery. As a result, temperature rise was 6° C. Assuming that all heat generation from the battery when it is discharged is caused by internal resistance of the battery, since the internal resistance of battery was 4 mΩ, total power consumption in discharge (resistance×(current)$^2$× discharging time) was 8923 W. Therefore, for battery weight of 0.86 kg and temperature rise of 6° C., the specific heat of battery was calculated as 1729 W/kg·° C.

When all energy (100 Wh) of this battery was assumed to be instantaneously discharged from the full charged state due to external short-circuiting caused by erroneous use or internal short-circuiting, since 100 Wh corresponded to 360000 W (100×3600 seconds), when this value is divided by the weight and specific heat of the battery, the temperature rise of the battery was calculated as 242° C., and it was found that the highest temperature reached was lower than the melting point of 660° C. of aluminum. Then, when the external short-circuiting test was conducted in a state where the battery was actually fully charged, the pressure release valve was actuated but there was caused no burst or firing, so that safety of the battery was confirmed to be assured.

Internal and External Short-Circuiting Tests

Batteries having various C/(w·c) values as shown in Table 3 were produced using an aluminum battery case by noticing the parameter of C/(w·c) consisting of the battery capacity C (Ah), the battery weight w (kg), and the specific heat c of battery (W/kg·° C.) calculated with the above method based on the result of the test for measuring specific heat of battery, and subjected to the nail piercing test (internal short-circuiting test) according to the SBA Guideline. Table 3 also lists the test results.

TABLE 3

|  | C/(w·c) | Situation after test | Evaluation |
|---|---|---|---|
| Example 7 | 0.015 | Pressure release valve actuated; no burst nor firing | ○ good |
| Example 8 | 0.018 | Pressure release valve actuated; no burst nor firing | ○ good |
| Example 9 | 0.03 | Pressure release valve actuated; no burst nor firing | ○ good |
| Comparative example 7 | 0.035 | Pressure release valve actuated; burst and firing occurred | X no good |

As listed in Table 3, in the case of examples 7–9 with C/(w·c) value of 0.03 or less, although the pressure release valve was activated, no significant change of shape was observed due to softening or melting of the battery case. However, in the case of comparative example 7 with C/(w·c) value of 0.035, the battery case was significantly deformed and partially cracked, and traces which were believed to indicate partial melting were observed. In addition, as for examples 7–9 and comparative example 7, when similar batteries were again produced, and subjected to the external short-circuiting test by short-circuiting the external terminal, there were provided the same results as the internal short-circuiting test shown in Table 3. From this, it was confirmed that the safety criteria prescribed in the SBA Guideline could be passed by making the C/(w·c) value 0.03 or less.

As described, according to the lithium secondary battery of the present invention, since it uses for the battery case aluminum which has lightweight and is excellent in conductivity, it has a very excellent advantage that the battery has light weight, and is significantly improved for the energy density than the prior art. Moreover, it is possible to provide a battery with excellent safety which can pass the criteria of SBA Guideline because the specific heat design of battery for the battery capacity and determination of shape of battery case are properly conducted.

What is claimed is:

1. A lithium secondary battery comprising:

a battery case; and an internal electrode body contained in the battery case and including a positive electrode, a negative electrode, and a separator made of porous polymer, the positive electrode and the negative electrode being wound or laminated through the separator so that the positive electrode and the negative electrode are not brought into direct contact with each other;

wherein said battery case is composed of pure aluminum or aluminum alloy containing one or more components selected from manganese, magnesium, silicon and copper, and wherein a relationship of C/(w·c)≦0.03 is established where current capacity is C (Ah), battery weight is w (kg), and specific heat of the battery is c (W/kg·° C.).

2. A lithium secondary battery according to claim 1, wherein a relationship of 0.004≦t/d≦0.04 is established where said battery case is cylindrical, its outer diameter is d (mm), and its wall thickness is t (mm).

3. A lithium secondary battery according to claim 1, wherein the capacity of said battery is 50 Wh or more.

4. A lithium secondary battery according to claim 1, wherein said positive active material comprises lithium-manganese oxide ($LiMn_2O_4$).

5. A lithium secondary battery according to claim 4, wherein said positive active material further comprises acetylene black.

* * * * *

UNITED STATES PATENT AND TRADEMARK OFFICE
CERTIFICATE OF CORRECTION

PATENT NO.     : 6,352,793 B2
DATED          : March 5, 2002
INVENTOR(S)    : Kenshin Kitoh and Hiroshi Nemoto It is certified that error appears in the above-identified patent and that said Letters Patent is hereby corrected as shown below:

<u>Title page,</u>
Item [75], ABSTRACT,
Lines 15-16, change "c(W/kg° C.)" to -- c(W•sec/kg° C.) --.

<u>Column 2,</u>
Line 63, change "c(W/kg•° C.)" to -- c(W•sec/kg•° C.) --.

<u>Column 5,</u>
Line 8, change "c(W/kg•° C.)" to -- c(W•sec/kg•° C.) --;
Line 11, change "power (W)" to -- energy (W•sec) --.

<u>Column 8,</u>
Line 41, change "8923 W" to -- 8923 W•sec --;
Line 43, change "1729 W/kg•° C." to -- 1729 W•sec/kg•° C. --;
Line 48, change "360000 W" to -- 360000 W•sec --;
Line 62, change "(W/kg•° C.)" to -- (W•sec/kg•° C.) --.

<u>Column 10,</u>
Line 20, change "(W/kg•° C.)" to -- (W•sec/kg•° C.) --.

Signed and Sealed this

Twentieth Day of January, 2004

JON W. DUDAS
*Acting Director of the United States Patent and Trademark Office*